United States Patent [19]
Miyakawa

[11] Patent Number: 4,650,376
[45] Date of Patent: Mar. 17, 1987

[54] STRUCTURE FOR INSTALLING A MULTISPINDLE ATTACHMENT ON A DRILLING MACHINE OR THE LIKE

[75] Inventor: Eiji Miyakawa, Tokyo, Japan

[73] Assignee: Miyakawa Industry Co., Ltd., Seki, Japan

[21] Appl. No.: 678,738

[22] Filed: Dec. 6, 1984

[51] Int. Cl.⁴ ............................................. B23B 47/14
[52] U.S. Cl. ................... 408/42; 192/67 R; 192/67 P; 192/94; 408/124; 408/234
[58] Field of Search ........................ 409/209, 233, 230; 408/25, 31, 42, 43, 46, 53, 124, 234; 82/36 B; 74/351, 665 GA; 29/26 R, 267, 568; 192/67 R, 67 P, 94, 108

[56] References Cited

U.S. PATENT DOCUMENTS

| | | | |
|---|---|---|---|
| 2,384,583 | 9/1945 | Wildhaber | 192/67 R |
| 2,738,210 | 3/1956 | Hjembo | 192/67 R X |
| 2,780,944 | 2/1957 | Ondeck | 408/124 |
| 2,919,775 | 1/1960 | Wiedmann et al. | 192/67 R X |
| 3,557,574 | 1/1971 | Avery | 192/67 R X |
| 3,794,436 | 2/1974 | Rowleh | 408/42 X |
| 3,849,018 | 11/1974 | Anderson | 408/46 |
| 3,977,806 | 8/1976 | Kinoshita | 192/67 R X |
| 4,123,191 | 10/1978 | Braun | 408/42 |
| 4,147,461 | 3/1979 | Maier | 408/46 |

FOREIGN PATENT DOCUMENTS

| | | | |
|---|---|---|---|
| 2134400 | 2/1972 | Fed. Rep. of Germany | 29/568 |
| 150903 | 11/1980 | Japan | 408/31 |

*Primary Examiner*—Gil Weidenfeld
*Assistant Examiner*—Glenn L. Webb
*Attorney, Agent, or Firm*—Jordan and Hamburg

[57] ABSTRACT

Disclosed is a structure for installing a multispindle attachment on a drilling machine or the like. An upper gear coupling member is secured at the lower end of a quill housing a main rotary spindle for a drilling machine, etc. A clamp member is rotatably provided on the gear coupling member. A lower gear coupling member for engaging with the upper gear coupling member is secured on the upper surface of the multispindle attachment installed at the lower end of the quill. Both of these gear coupling members are tightened and secured by means of the clamp member while both of the upper and lower gear coupling members are engaged with each other.

5 Claims, 5 Drawing Figures

STRUCTURE FOR INSTALLING A MULTISPINDLE ATTACHMENT ON A DRILLING MACHINE OR THE LIKE

BACKGROUND OF THE INVENTION

The present invention relates to a structure for installing a multispindle attachment on the body of a drilling machine or a tapping machine.

SUMMARY OF THE INVENTION

An object of the invention is to provide a structure for installing a multispindle attachment which makes it possible to easily install a multispindle attachment on the body of a drilling machine or the like with a single operation, and which, even when thrust acts on a drill or tap to incline the same, makes it possible to support this thrust positively.

Accordingly, there is provided a structure for installing a multispindle attachment in a drilling machine or the like, characterized in that an upper gear coupling member is secured to the lower end of a quill housing a main rotary spindle for a drilling machine, etc., a clamp member being rotatably provided to the gear coupling member, a lower gear coupling member for engaging with the upper gear coupling member being secured on the upper surface of said multispindle attachment mounted at the lower end of said quill, and both of these gear coupling members being tightened and secured by means of the clamp member while both of these gear coupling members are engaged with each other.

DESCRIPTION OF THE PREFERRED EMBODIMENT

Figure 1:
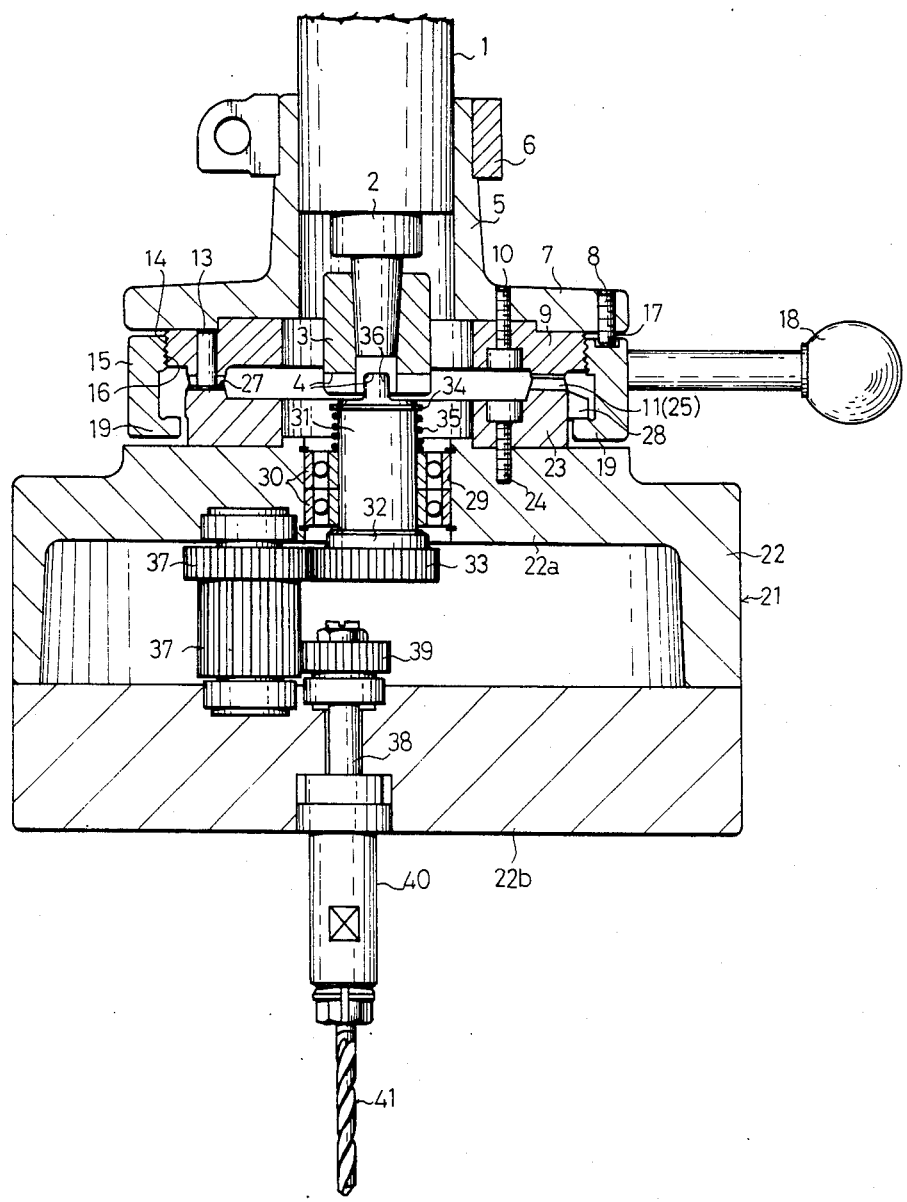
FIG. 1 is a cross-sectional view of an installing structure embodying the present invention.

A preferred embodiment of the present invention applied to a drilling machine will be described hereinunder with reference to the drawings. The reference numeral 1 denotes a quill, and the reference numeral 2 a main rotary spindle penetrating the quill 1. A coupling member 3 with a flat bottom is installed rotatably at the lower end of the main rotary spindle 2 integrally with the main rotary spindle 2. The reference numeral 4 denotes a pair of retainer grooves recessed at the bottom surface of the coupling member 3, which intersect each other in a crossed shape.

The reference numeral 5 denotes a cylindrical body installed around the lower periphery of the quill 1, and the reference numeral 6 a tightening ring placed around the upper periphery of the cylindrical body 5, said tightening ring being capable of fixing the overall cylindrical body 5 to the quill 1. The reference numeral 7 denotes an installing flange formed integrally with the lower periphery of the cylindrical body 5, and the reference numeral 8 a restricting pin buried in an outer side portion of the flange 7. The lower end of the restricting pin 8 projects slightly downwardly from the flange 7.

The reference numeral 9 denotes an annular upper gear coupling member provided at the lower surface of the flange 7, said upper gear coupling member 9 being secured to the flange 7 by means of four bolts 10 inserted from below. The outer diameter of the upper gear coupling 9 is smaller than the outer diameter of the installing flange 7. The reference numeral 11 denotes a crown gear formed along the entire peripheral edge portion of the lower surface of the upper gear coupling member 9, each of the respective teeth 12 thereof being of such a shape that the apex of an involute gear is cut off horizontally. The reference numeral 13 denotes a positioning pin buried in the crown gear 11 in such a manner as to bury one of the valleys between the teeth 12 and 12.

The reference numeral 14 denotes an external thread portion provided at the periphery of the upper gear coupling member 9, and the reference numeral 15 a virtually cylindrically shaped clamp member for engaging the external thread portion 14 with an internal thread portion formed along the internal periphery of the upper end thereof. The clamp portion 15 is movable vertically with respect to the upper gear coupling 9. The reference numeral 17 denotes a restricting groove recessed on the upper surface of the clamp member 15. The restricting groove 17 extends in an arc shape, and the lower end of the restricting pin 8 is movably inserted therein. The restricting groove 17 extends in an arc shape. The reference numeral 18 denotes an operating handle projecting outwardly from the peripheral surface of the clamp member 15.

The reference numeral 19 denotes a flange portion projecting inwardly from the lower end of the clamp member 15 and extending along the entire circumferencial direction of the clamp member 15. The reference numeral 20 denotes recesses for insertion formed by notching the flange portion 19 at three portions, said recesses being equidistant from each other.

The reference numeral 21 denotes a multispindle attachment supported by the clamp member 15, and the reference numeral 22 a case thereof. On the upper wall 22a thereof is mounted an annular lower gear coupling member 23 similar to the upper gear coupling member 9. The lower gear coupling member 23 is secured on the multispindle attachment 21 by means of four bolts 24 inserted from above. The reference numeral 25 denotes a crown gear formed along the entire peripheral edge portion of the upper surface of the lower gear coupling member 23, each of the respective teeth 26 thereof being of such a shape that the apex of an involute gear is cut off. The reference numeral 27 denotes a notched portion which is formed by removing one of the multiplicity of teeth 26, said notched portion 27 corresponding to the positioning pin 13 projecting downwardly from the upper gear coupling member 9.

The reference numeral 28 denotes three retainer projections projecting outwardly from the peripheral surface of the lower gear coupling member 23. Said retainer projections 28 are equidistant from each other such that they are capable of being inserted with play into the three insertion recesses 20 provided on the lower surface of the clamp member 15. These retainer projections 28 are retained at the upper surface of the flange portion 19 of the clamp member 15 and are adapted to prevent the multispindle attachment 21 from falling downwardly.

The reference numeral 29 denotes an installation hole which penetrates the central portion of the upper wall 22a of the case 22 of the multispindle attachment 21, and vertically arranged two bearings 30 are mounted therein. The reference numeral 31 denotes a gear shaft rotatably supported by the bearings 30, and a driving gear 33 is integrally formed at the lower end thereof via a step portion 32. The reference numeral 34 denotes a stop ring fitted around the periphery of the upper end of the gear shaft 31, and the reference numeral 35 denotes a coil spring interposed between the stop ring 34 and the upper bearing 30. Said coil spring 35 constantly urges the gear shaft 31 and the driving gear 33 by pushing the same upwardly. The reference numeral 36 denotes an engaging projection projecting from the upper surface of the gear shaft 31, and said engaging projection 36 is adapted to be capable of engaging with either of the pair of retainer grooves 4 of the coupling member 3.

The reference numeral 37 denotes vertically arranged two intermediate gears provided rotatably between the upper wall 22a and the bottom wall 22b of the case 22 on the side of the driving gear 33, said upper intermediate gear 37 being engaged with the driving gear 33. The reference numeral 38 denotes a spindle shaft installed rotatably on the bottom wall 22b of the case 22, while the reference numeral 39 denotes a spindle gear installed at the upper end of the spindle shaft 38. The spindle gear 39 is engaged with the lower intermediate gear 37. The reference numeral 40 denotes a spindle, and the reference numeral 41 denotes a drill installed at the lower end thereof. The axial center of the spindle 40 is offset sideways from the center of the driving gear 33.

Figure 2:
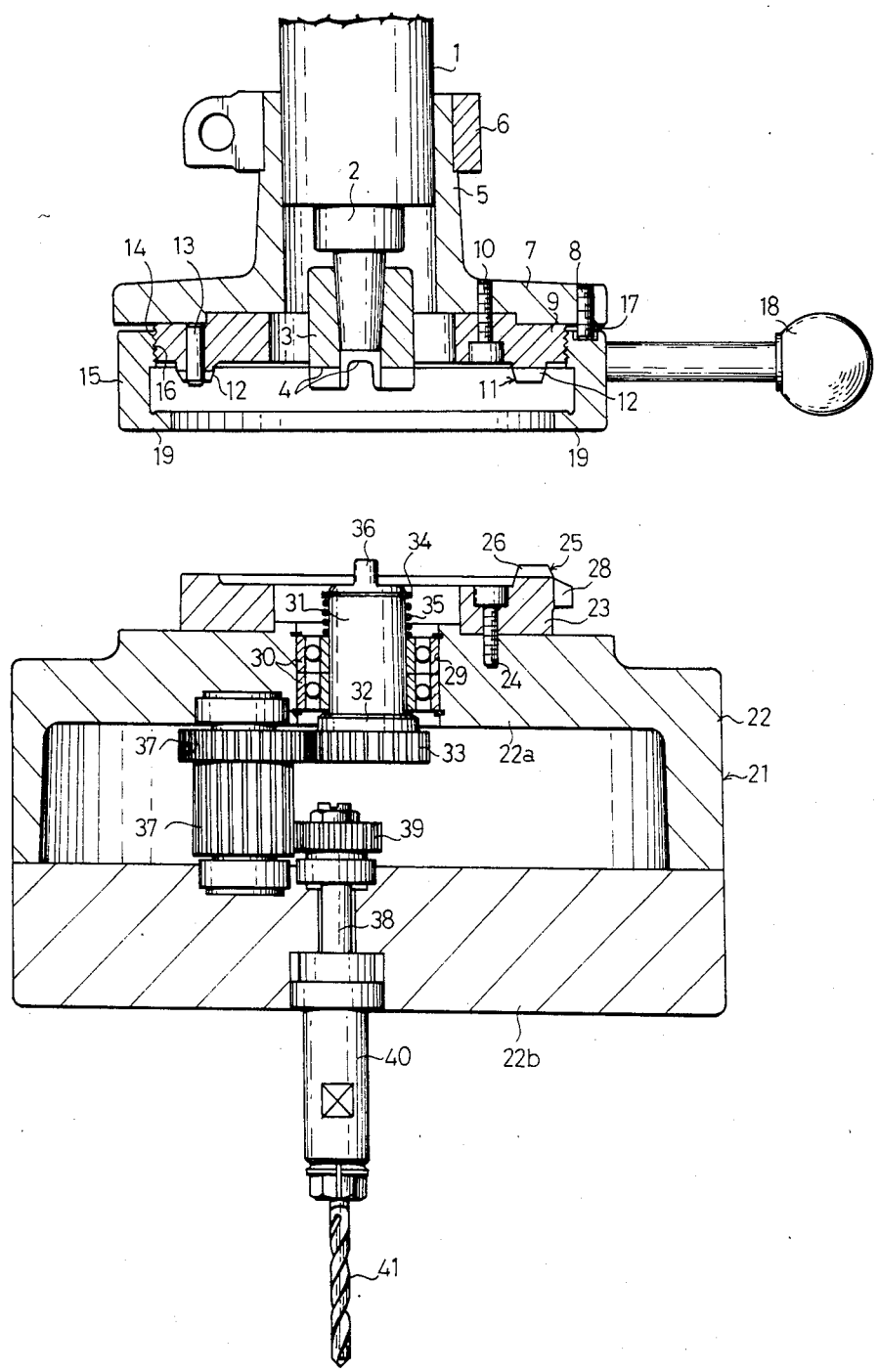
FIG. 2 is an exploded cross-sectional view of said installing structure.

Incidentally, although only one set consisting of the spindle 40, the drill 41, the spindle gear 39, the intermediate gear 37, and so forth was shown in FIGS. 1 and 2, a plurality of sets are normally installed.

When installing the multispindle attachment 21 having the aforementioned arrangement to the cylindrical body 5 on the quill 1, as shown in FIG. 2, the three retainer projections 28 of the lower gear coupling member 23 on the multispindle attachment 21 are inserted into the three insertion recesses 20 at the lower end of the clamp member 15 from below, and the crown gear 25 on the upper surface of the lower gear coupling member 23 is engaged with the crown gear 11 on the lower surface of the upper gear coupling member 9. When engaging the teeth, in a case where the tips of the teeth 12 and 26 of both the crown gears 11 and 25 are brought into contact with each other, it is possible to engage both of the crown gears 11 and 25 properly if the overall multispindle attachment 21 is moved slightly in the peripheral direction since the teeth 12 and 26 will correspond to the valleys.

When thus engaging the crown gears 11 and 25 of both of the upper and lower gear coupling members 9 and 23, the positioning pin 13 of the upper gear coupling member 9 is made to correspond to the notched portion 27 of the lower gear coupling member 23.

If both of the crown gears 11 and 25 are engaged with each other, the retainer projections 28 of the lower gear coupling member 23 are situated above the flange portion 19 at the lower end of the clamp member 15. Accordingly, in this state, the clamp member 15 is rotated in the horizontal direction (clockwise as viewed in FIG. 3) while holding the operating handle 18. Then, as shown in FIG. 1, the flange portion 19 at the lower end of the clamp member 15 is retained at the lower surface of the retainer projections 28 of the lower gear coupling member 23, and, at the same time, the clamp member 15 is moved upwardly along the upper gear coupling member 9. Consequently, the lower gear coupling member 23 is lifted by means of the clamp member 15, and the crown gears 11 and 25 of both of the upper and lower coupling members 9 and 23 are strongly pressed against each other. Then, the multispindle attachment 21 is secured in such a manner that it is incapable of inclining with respect to the cylindrical body 5.

As described above, when rotating the clamp member 15, the lower end of the restricting pin 8 projecting downwardly from the cylindrical body 5 moves inside the restricting groove 17 on the clamp member 15.

Accordingly, this installation can be effected simply by a single operation if the multispindle attachment 21 is installed on the drilling machine body, as described above.

In addition, in a case where, when the retainer projections 28 of the lower gear coupling member 23 are inserted from below into the clamp member 15 so as to install the multispindle attachment 21, as described above, the engaging projection 36 at the upper end of the gear shaft 31 situated at the center of the multispindle attachment 21 cannot be engaged with either of the retainer grooves 4 on the lower surface of the coupling member 3, the engaging projection 36 being pushed downwardly by opposing the resilience of the coil spring 35 by means of the coupling member 3. Furthermore, even when the engaging projection 36 is thus pressed downwardly, the driving gear 33 at the lower end of the gear shaft 31 is not disengaged from the upper intermediate gear 37 which is engaged therewith.

When the engaging projection 36 of the gear shaft 31 fails to be engaged with the retainer groove 4, the gear shaft 31 is rotated via the spindle gear 39, the intermediate gear 37, and the driving gear 33 by manually rotating the spindle 40 after installing and fixing the multispindle attachment 21. Then, when the engaging projection 36 corresponds to either of the retainer grooves 4, the engaging projection 36 enters the retainer groove 4 as it is pushed upwardly by the resilience of the coil spring 35. As a result, the gear shaft 31 is rotatably coupled with the main rotary spindle 2 integrally therewith.

Now, when performing drilling work by installing this multispindle attachment 21, if a plurality of drills 41 are installed at positions offset from the central position of the multispindle attachment 21, the thrust acting upwardly upon these drills 41 operates in such a manner as to incline the multispindle attachment 21. In the aforementioned preferred embodiment, however, since crown gears 11 and 25 are respectively formed along the entire periphery of both of the upper and lower coupling members 9 and 23 so as to receive the upward thrust of the drills 41, this thrust can be positively received even if the thrust is biased and acts upon the multispindle attachment 21.

Even if the positions of the plurality of drills 41 are not particularly offset, there are cases in which an inclining force may act upon this attachment 21. Such cases occur when the diameters of the respective drills 41 differ to thereby provide different thrusts acting on them, with the result that a force in the inclined direction is applied on the multispindle attachment 21, or when the multispindle attachment 21 is used by installing the same in a horizontal direction. Even in such cases, however, the inclination of the multispindle attachment 21 can be prevented by the engagement between both the upper and lower gear coupling members 9 and 23.

Figure 3:
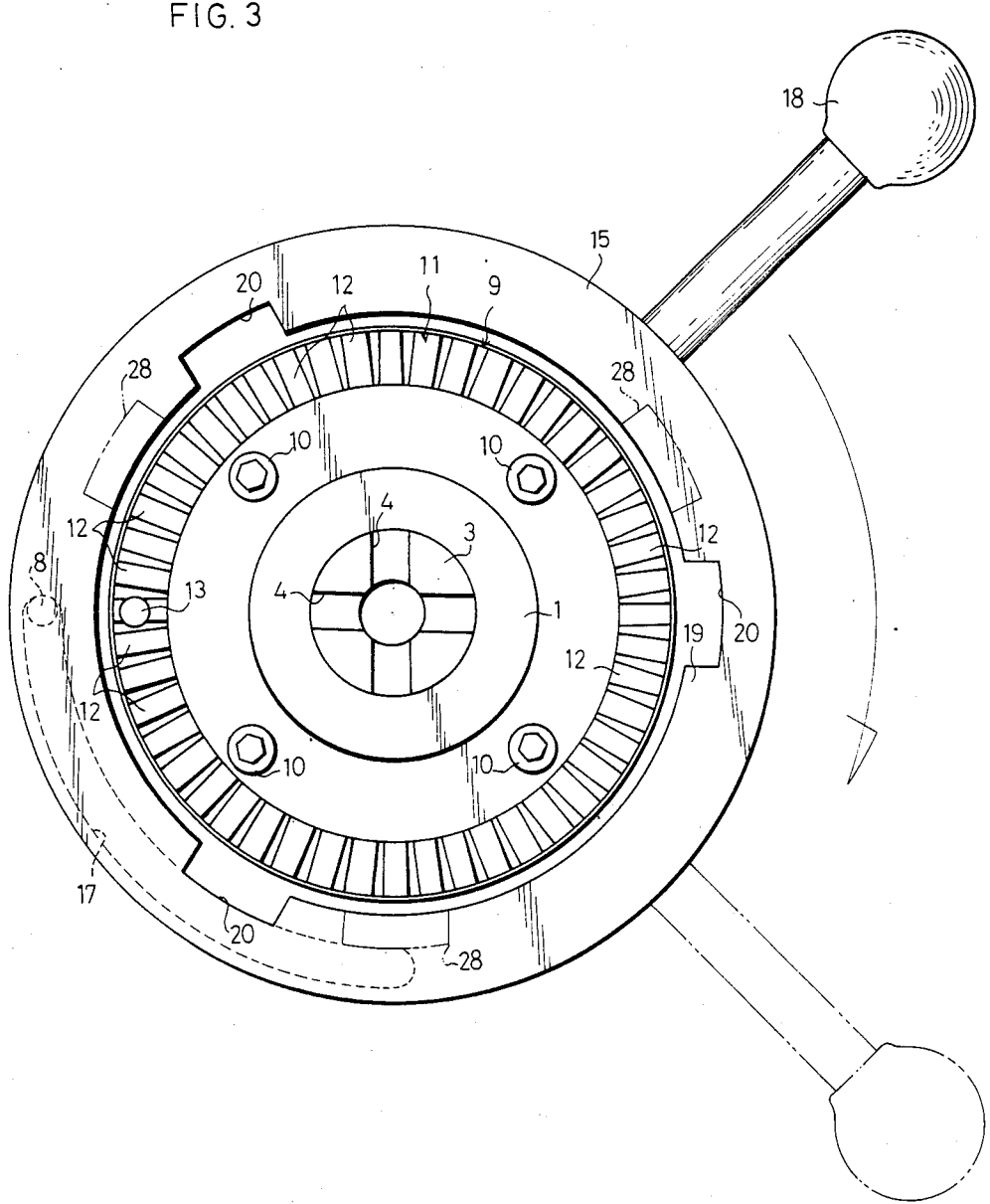
FIG. 3 is a bottom view of an upper gear coupling member and a clamp member.
Figure 4:
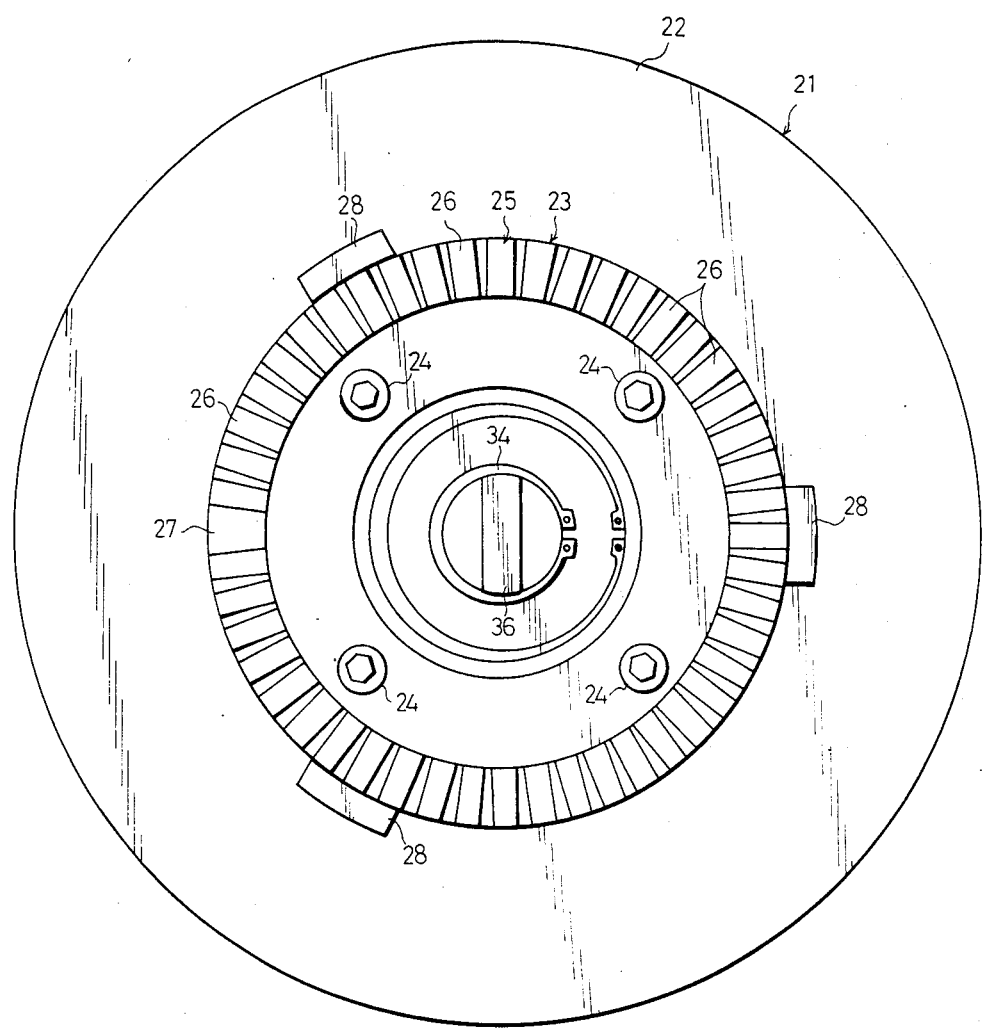
FIG. 4 is a top plan view of a lower gear coupling member and a multispindle attachment.
Figure 5:
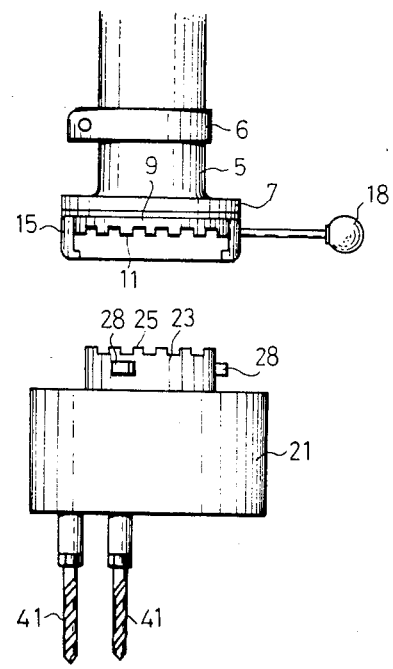
FIG. 5 is a schematic front elevational view showing a drill being mounted in an offset manner with respect to the multispindle attachment.

When replacing the multispindle attachment 21 with another attachment, the operating handle 18 of the clamp member 15 is rotated counterclockwise as viewed in FIG. 3, i.e., in the opposite direction of that for installing the attachment 21, and the multispindle attachment 21 is pulled out downwardly from the clamp member 15 and removed therefrom when the insertion recesses 20 at the lower end of the clamp member 15 corresponds to the retainer projections 28 of the lower gear coupling member 23. Then, another multispindle attachment can be installed by an operation similar to the one mentioned above.

At the time of such installation, since both of the upper and lower gear coupling members 9 and 23 are provided with a positioning pin 13 and a notched portion 27 which correspond to each other, the position of securing the lower gear coupling member 23 to the upper gear coupling member 23 is constantly kept fixed without being offset in the circumferencial direction.

Furthermore, the teeth of the crown gears 11 and 25 of the respective upper and lower gear coupling members 9 and 23 may be formed with a configuration such that the inclined sides of each tooth form the two non-parallel sides of a trapezoid and such that the inclined surfaces thereof may come into contact with each other. Also, it is possible to change to two or four or more the number of the retainer projections 28 around the periphery of the lower gear coupling member 23 as well as the insertion recesses 20 corresponding thereto.

The structure for installing a multispindle attachment of this invention is applicable to a tapping machine, etc. in addition to a drilling machine.

Because of said arrangement, the multispindle attachment can be easily installed on the body of a drilling machine or the like with a single operation. Furthermore, even if thrust is created by drills or taps, acting upon the multispindle attachment to incline the same, this thrust can be positively supported.

I claim:

1. A multispindle drill head structure, comprising:
   a spindle mechanism including a main rotary spindle adapted to be rotated by power means and having a coupling at one end thereof, and a quill surrounding the main rotary spindle,
   an upper structure securely connected to the quill to permit the main rotary spindle to pass therethrough, said upper structure including an upper gear coupling member having an upper crown gear extending downwardly therefrom to surround the main rotary spindle,
   a multispindle attachment including a case, a gear mechanism installed inside the case and having a main shaft to be engaged with the coupling of the main rotary spindle, and a lower gear coupling member securely connected to the case and having a lower crown gear extending upwardly therefrom to surround the main shaft and a plurality of projections extending radially outwardly therefrom to be symmetrically arranged relative to the main shaft,
   a clamp member securely and rotationally connected to the upper structure and including a cylindrical body and a flange connected to a lower end of the cylindrical body to extend radially inwardly therefrom, said flange having a plurality of notches symmetrically arranged relative to the main rotary spindle, said clamp member being rotated relative to the upper structure after the upper and lower crown gears abut against each other and after the projections are inserted into the notches, to allow the flange to engage the projections to securely fix the multispindle attachment to the upper structure.

2. A multispindle drill head structure according to claim 1, in which said clamp member further includes female threads formed inside the cylindrical body and a handle extending outwardly from the cylindrical body, said upper gear coupling member further including male threads on an outer periphery thereof, said female threads of the clamp member engaging the male threads of the upper gear coupling member.

3. A multispindle drill head structure according to claim 2, in which said upper structure further includes an installing flange connected to the quill and having a restricting pin extending downwardly therefrom, said upper gear coupling member being connected to the installing flange, said clamp member further including a restricting groove on an upper surface of the cylindrical body, said restricting pin being situated in the restricting groove so that the clamp member can rotate between a first position where the lower gear coupling member is engaged with the upper gear coupling member and a second position where the lower gear coupling member is securely attached to the upper gear coupling member by means of the clamp member.

4. A multispindle drill head structure according to claim 1, in which said gear mechanism of the multispindle attachment further includes a bearing for rotationally supporting the main shaft, a stop ring attached to the main shaft, and a spring situated between the bearing and the stop ring so that the main shaft is resiliently retained by the bearing.

5. A multispindle drill head structure according to claim 1, in which said upper crown gear of the upper gear coupling member includes a positioning pin extending downwardly therefrom, and the lower crown gear of the lower gear coupling member includes a notched portion thereon, said upper and lower crown gears firmly engaging with each other only when the positioning pin is located in the notched portion.

* * * * *